July 31, 1956 — J. W. OEHRLI — 2,756,735
SUPERCHARGER FUEL SYSTEM FOR INTERNAL COMBUSTION ENGINES
Filed Oct. 18, 1954

INVENTOR
JOHN W. OEHRLI
BY
ATTORNEY

United States Patent Office 2,756,735
Patented July 31, 1956

2,756,735

SUPERCHARGER FUEL SYSTEM FOR INTERNAL COMBUSTION ENGINES

John W. Oehrli, Los Angeles, Calif., assignor to McCulloch Motors Corporation, Los Angeles, Calif., a corporation of Wisconsin Application October 18, 1954, Serial No. 463,012

2 Claims. (Cl. 123—119)

This invention relates to a supercharger system for internal combustion engines and relates in particular to a supercharger system having means for alleviating or eliminating a condition known as hard starting.

When an engine, equipped with a supercharger, is stopped after a period of operation, the engine and associated parts are hot. Gasoline in the carburetor will vaporize and the fuel vapors thus formed will pass into the air duct which connects the supercharger with the carburetor inlet, displacing air therefrom. Under some circumstances the fuel vapors may flow into the air passages of the supercharger. The result of this filling of air passages with fuel vapors is to cause hard restarting of the engine, owing to the fact that when the engine starter turns the engine over, the rich fuel vapors are drawn through the carburetor into the cylinders without sufficient oxygen to produce a combustible fuel mixture. Under these conditions the engine will not start until it is operated by the starter for a sufficient time to remove the overrich fuel mixture and enable air to pass through the carburetor.

It is an object of the invention to provide a supercharger system for use with an internal combustion engine having a carburetor, this system having means for preventing the accumulation of excess quantities of fuel vapors in the air passages communicating with the carburetor intake. Therefore, when the engine is subjected to starting operation air from the exterior will be quickly drawn through the carburetor, producing a combustible mixture which is drawn into the engine cylinders.

It is a further object of the invention to provide a supercharger system of this character having an air duct for connecting the supercharger outlet with the carburetor inlet, this air duct having, near the carburetor intake, openings through which fuel vapors from the carburetor may pass to the exterior when the supercharger is idle, there being means for effecting the closing of the openings when the supercharger is operating to deliver air under pressure to the carburetor intake.

A further object of the invention is to provide a supercharger system wherein the air duct leading from the supercharger to the carburetor intake has a substantially horizontal portion adjacent the carburetor intake, there being openings in the upper wall of this horizontal duct portion and a closure member suspended below these openings so that communication between the interior of the air duct and the exterior is established when the supercharger is idle, the closure member being adapted to be moved by air pressure created by the operation of the supercharger into raised position wherein the openings will be closed and the escape of air under pressure is therethrough prevented.

It is a further object of the invention to provide a supercharger system having an air duct connecting the supercharger outlet with the carburetor inlet, there being valve means for connecting the carburetor intake with the exterior when the supercharger is idle, with means operative to close the valve when the supercharger is operating to deliver air under pressure to the carburetor.

Herein the term "idle" does not necessarily mean that the impeller of the supercharger is standing stationary, but is also descriptive of a condition wherein it may be rotating at such slow speed as to have but little air pumping effect.

Further objects and advantages of the invention may be brought out in the following part of the specification wherein the description of parts is for the purpose of disclosing a preferred embodiment of the invention, without the intention of limiting the invention which is defined by the accompanying claims.

Referring to the accompanying drawings which are for illustrative purposes only:

Figures 1, 2:
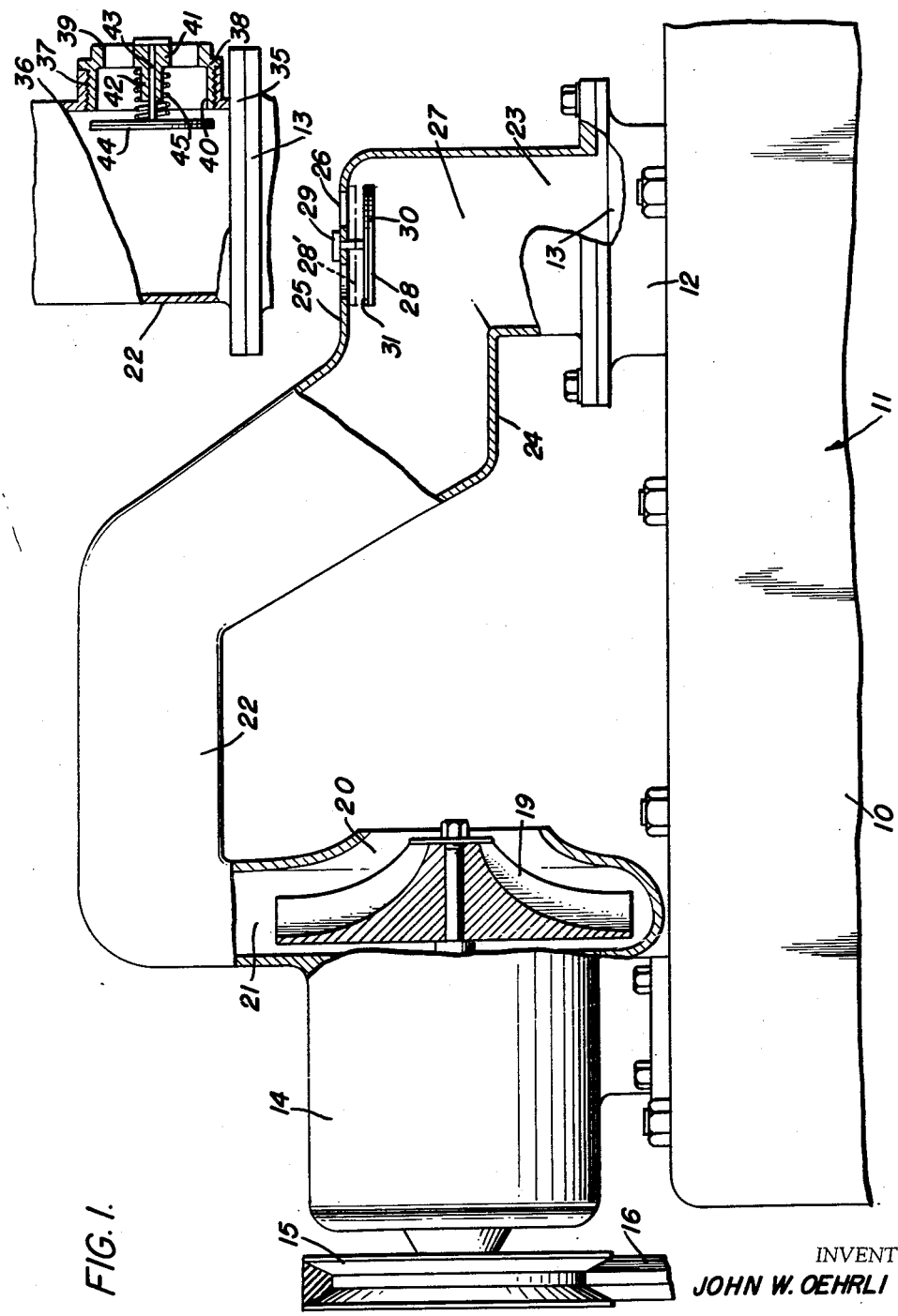
Fig. 1 is a partially sectioned fragmentary elevational view showing a preferred form of the supercharger system.
Fig. 2 is a partially sectioned fragmentary view showing an alternative form of valve device.

In Fig. 1, I show the head 10 of an engine 11 having a carburetor 12 equipped with an upwardly faced air inlet 13. A supercharger 14 is mounted on the head 10 in such position that the power receiving pulley 15 thereof will overhang the front end of the engine 11 so as to be driven by a belt 16 from a pulley, not shown, located at the front of the engine 11.

The supercharger 14 has a shaft 18 carrying an impeller 19 which draws air through an inlet opening 20 and discharges the same under pressure through an outlet 21 to an air duct member 22 which has its outlet end 23 connected to the intake 13 of the carburetor 12.

Adjacent the carburetor intake 13, the duct 22 has a horizontal portion 24. In the upper wall 25 of the horizontal portion 24 openings 26 are provided which connect the carburetor intake 13 through the portion 27 of the duct member 22 lying between the openings 26 and the intake 13, with the external atmosphere. A valve closure member 28 is suspended by a stem 29 below the openings 26. This closure member 28 consists of a circular plate which is connected to the lower end of the stem 29 and a gasket 31 which lies upon the upper face of the plate 30.

When the engine is stopped and the supercharger 14 is idle, fuel vapors which rise from the carburetor within the outlet end 23 of the air duct 22, will pass to the exterior through the openings 26 due to the fact that these fuel vapors are heavier than air and therefore will not travel any great distance up through the duct member 22. When the engine is subjected to a starting operation, the suction exerted by the movement of the engine pistons within the cylinders will draw air into the openings 26 and also through the supercharger intake 20 and the duct member 22, relatively quickly displacing the fuel vapors which have accumulated in the end of the air duct 22 adjacent the carburetor intake 13, air then passing through the carburetor to form a combustible fuel mixture so that the engine may start with undue delay. As the speed of the supercharger impeller 19 increases it will force air under pressure through the duct member 22 and such air will raise the closure 28 from the suspended position in which it is shown in full lines to the raised position thereof indicated by dotted lines 28' to close the openings 26 and prevent escape of air therethrough.

In Fig. 2, I show an alternative means for connecting the carburetor intake with the exterior during the time the supercharger is idle. Immediately above its lower end 35 which is connected to the carburetor intake 13, the side wall 36 of the air duct 22 is provided with a threaded opening 37 which receives the casing 38 of a valve device 39. This valve device 39 has an inwardly faced seat 40 and a spider 41 supporting a hub 42 arranged to slidably carry a stem 43 having a closure plate 44 mounted on its inner end. A compression spring 45 is provided between the closure plate 44 and the spider 41 to hold the closure plate 44 in open relation to the seat 40 when the supercharger 14 is idle. Gas vapors arising from the carburetor 12 within the adjacent end of the air duct 22 may pass freely out through the valve device 39 to the exterior immediately above the carburetor intake 13, the result being that only a minimum of fuel vapors may accumulate in the end of the air duct 22 which is connected to the intake 13. When the engine is subjected to starting operation, air from the exterior may flow in through the valve device 39 and also from the portion of the air duct 22 which extends above the valve device 39, quickly displacing the accumulated fuel vapors so that air may pass through the carburetor to produce a combustible fuel mixture. As air pressure is created in the air duct 22 by the operation of the supercharger 14 the air will act outwardly against the closure plate 42 to move it into engagement with the valve seat 40 to thereby prevent escape of compressed air through the valve device 39.

I claim:

1. In a supercharger fuel system for an internal combustion engine having a carburetor provided with an upwardly faced air intake: a supercharger mounted on said engine and having an outlet through which air under pressure is discharged by an impeller mounted on a shaft; belt and pulley means for driving said supercharger shaft from the crankshaft of said engine; an air duct member connecting said air outlet of said supercharger with said intake of said carburetor, said duct member being of inverted U-shape having first side portion connected to and extending upwardly from said carburetor intake, the remaining side portion being connected to and extending upwardly from the outlet of said supercharger, and the intermediate portion thereof elevated with relation to said carburetor intake, the wall of said first portion having therein an opening in proximity to said intake and below said intermediate portion to connect said intake with the outer atmosphere when said supercharger is idle and through which fuel vapors from said carburetor flow to the exterior of said duct member intsead of upwardly within said air duct member; and valve closure means arranged in said duct member adjacent said opening and being adapted to be moved by pressure of air fed into said duct member by said supercharger into a position to cover said opening and prevent escape of air therethrough.

2. A supercharger control system as defined by claim 1 wherein said valve closure means is arranged so as to be held open by gravity when a pressure not materially greater than atmospheric exists in said air duct member.

References Cited in the file of this patent
UNITED STATES PATENTS

| | | |
|---|---|---|
| 1,375,931 | Rateau | Apr. 26, 1921 |
| 2,538,455 | Holmes | Jan. 16, 1951 |
| 2,585,236 | Fitzgerald | Feb. 12, 1952 |
| 2,683,444 | Miller | July 13, 1954 |